United States Patent Office 3,753,890
Patented Aug. 21, 1973

3,753,890
MULTIPLE TOOL FOR ELECTROCHEMICAL MACHINING OR FORMING
Heinz Köppern and Helmut Kubeth, Hattingen (Ruhr), Germany, and Lynn A. Williams, Winnetka, Ill., assignors to Koppern & Co., KG Maschinenfabrik
Filed Aug. 15, 1969, Ser. No. 850,558
Claims priority, application Germany, July 17, 1968, P 17 65 779.3
Int. Cl. B23p 1/02; C23b 5/72; B01k 3/04
U.S. Cl. 204—224
19 Claims

ABSTRACT OF THE DISCLOSURE

An improved multiple tool for electrochemical machining or forming, with a plurality of simultaneously operating individual tools for processing large workpieces, wherein the number of countersinking operations is a multiple of the number of individual tools, wherein the improvement comprises a reliable safety arrangement against leakage of the electrolyte so as to prevent the whole surface of the workpiece from being exposed to the action of the electrolyte.

---

In electrochemical machining (ECM) or electrochemical forming (ECF), an electrode, having generally the form of a negative of the shape to be produced, is sunk into the workpiece to be machined. During this, a liquid electrolyte solution flows through a gap existing between the tool electrode and the workpiece. The electrode and the workpiece are connected to the negative and positive terminals of a D.C. source, respectively. Charge exchange processes between the tool electrode and the electrolyte solution on one hand, and between the workpiece and the electrolyte solution on the other hand, cause material of the workpiece to be dissolved at the working points in a controlled and localized manner. Since, during the operation, the electrode is moved towards the workpiece, the complementary shape of this electrode is reproduced in the workpiece. In other to achieve an optimum result of this operation with regard to the removal performance, the surface properties and the dimensional accuracy, it is also necessary to force the solution of the electrolyte at high flow velocity through the gap between the tool electrode and the workpiece. In the following description, this gap will be referred to as the working gap.

The solution of the electrolyte is a strongly corrosive medium, particularly under the action of electrical voltages. It is therefore necessary to take precautions for preventing corrosion and wear of the processing plant, the tools, devices and of the workpieces to be processed.

It is already known to use, as protection against leakages of electrolyte solution, hoods which cover the whole working zone of the installation and the tool. These hoods are easy to use with small tools and may be constructed on the tool itself.

However, the expenditure for these hoods, which must be manufactured from corrosion-resistant materials, becomes almost prohibitive in the case of larger workpieces, where these must be worked in successive stages by means of the same tools. This is the case, for example, when countersinking form molds into bandages of briquetting presses. Another disadvantage of a hood covering the entire workpiece is that the whole workpiece is continuously exposed to the corrosive action of the electrolyte solution or the forming electrolyte vapors. Furthermore, during the processing, no inspection of the workpiece can be made, and, in consequence, any faults occurring during the processing of a workpiece with several identical countersinking operations cannot be detected and corrected in time.

It is the object of the invention to provide a simply manufactured and reliably operating safety arrangement against leakage of an electrolyte in liquid or vapor phase so that the workpiece is no longer wholly exposed to the liquid electrolyte and the operation can be freely inspected and controlled.

According to the invention, this object is realized by providing splash strips on both sides of the individual tools, wherein these splash strips have elastic sealing strips on the side facing the workpiece.

Preferably, the sealing strip consists of a plurality of cross-laminated rubber plates, arranged substantially perpendicularly to the surface of the workpiece. Furthermore, the sealing strips are preferably wider than the dimensions of the formed depressions in the direction perpendicular to the seal.

Preferably, the sealing strips are mounted in a retaining member fixed sealingly on the tool carrier.

Preferably the said retaining member or holder has a groove, open towards the workpiece, and the sealing strip is mounted on a carrier which is guided displaceably in the said groove and is biased by springs which rest on the bottom of the groove.

Particularly in the manufacture of briquette forming rings, the individual tools must be arranged in accordance with the dimensions of the forming ring and the shape of the molds, and, thus, also with the distribution of the molds over the periphery of the ring. In a particularly convenient arrangement, the fluid distributor carrying the individual tools has longitudinal grooves, open towards the tools and provided with connections for supplying and removing the liquid electrolyte, and comprises an exchangeable strip covering the grooves and equipped with connecting bores for the individual tools at appropriate intervals.

The invention will be further described by way of example, with reference to the accompanying drawings in which.

Figure 1:
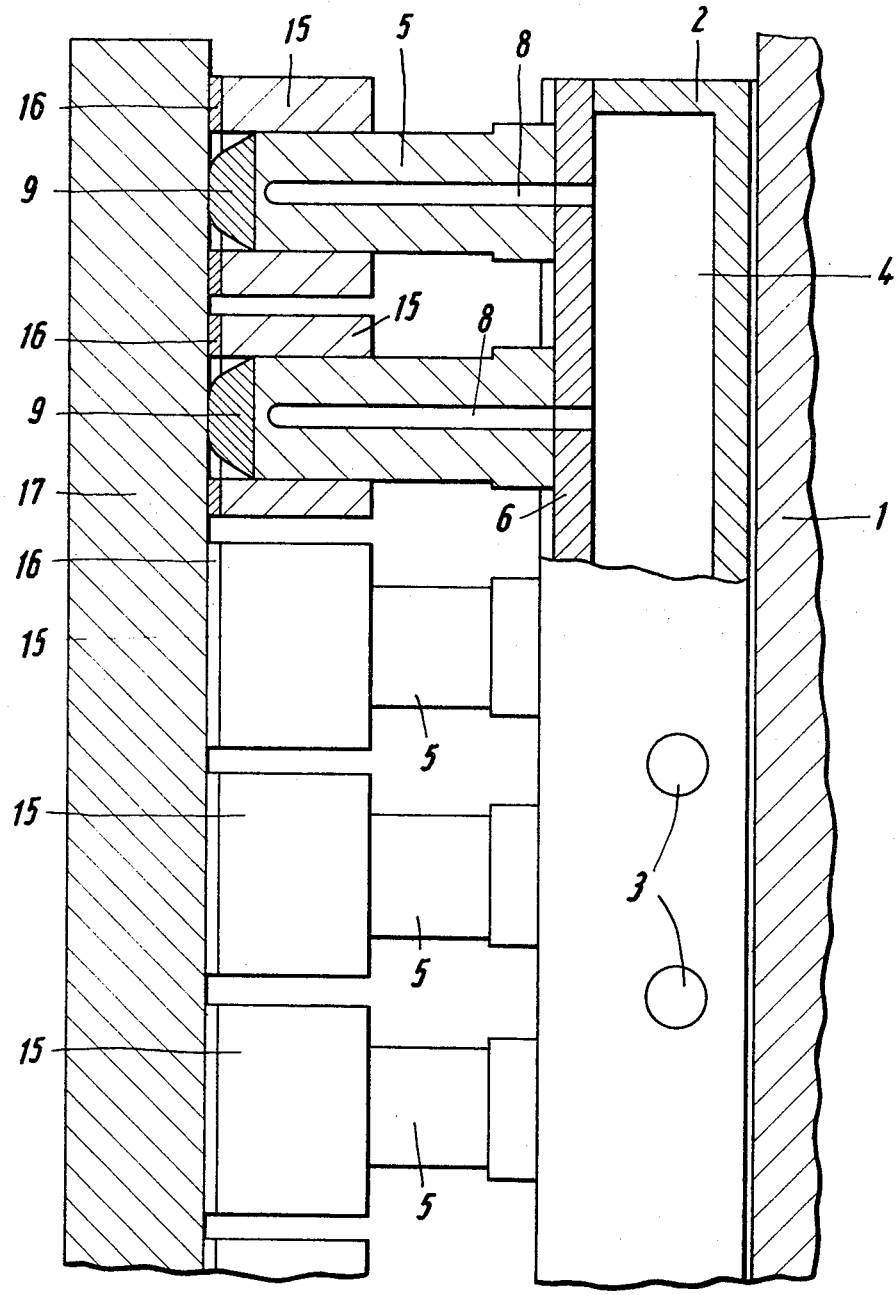
FIG. 1 shows a side elevation of a tool according to the invention in partial cross-section.

A base plate 2 is mounted on the feed head 1 of a processing plant of known construction. This base plate has two parallel grooves 4, 12 extending substantially over the whole height of the tool base plate. A plurality of connecting bores 3, 13 is provided in the sides of the base plate. These bores lead into the grooves 4, 12 and communicate with connecting hoses 14 by means of screwed connections.

The base plate 2 carries a plurality of electrode holders 5, the distance of which depends on the distance between the forming molds to be made in the mold rings to be processed. For mounting the electrode holders, the base plate contains preferably undercut grooves, arranged parallel with the grooves 4; into these grooves engage the heads of fixing screws, whereby the electrode holders can be set at any point over the height of the tool base plate 2.

A strip 6, extending over the entire height of the tool base plate, is provided for covering the grooves 12, 4. This strip is exchangeable and is provided with bores 7, 11 spaced apart in accordance with the desired spacing of the electrode holders, so that the electrode holders can be supplied with liquid electrolyte through these bores.

Thus, the liquid electrolyte may flow through the bore 3 into the groove 4, and from there through the bore 7 into longitudinal bores 8 of the electrode holder. It then flows around the electrode 9, or through the working gap, and from there through the bore 10 in the electrode holder, the bore 11 in the strip 6 into the collecting groove 12, from which it returns to the tank through the bores 13 and connections 14, preferably hoses.

A mask, consisting of a base body 15 and a forming window 16 is displaceably guided on each electrode holder 5. Through this mask, the liquid electrolyte passes through the working gap, and this mask ensures also a sufficiently sharply defined edge of the rim of the forming mold. The forming window 16 is pressed by springs 18 against the workpiece, in this instance forming mold ring for roller presses. In order to achieve as tight a contact as possible, the surface is adapted to the surface of the workpiece.

A separate mask may be provided for each electrode holder, as shown in the drawing; it is, however, also possible to provide a continuous mask, made in one piece, and equipped with corresponding guide bores.

The arrangement described above operates as follows:

For starting the countersinking operation, the tool is moved from its fully retracted position into the working position, with the mask located in the forward end position under the bias of the springs 18. After the mask has made contact with the ring 17, the delivery of electrolyte through the tool is actuated, thus initiating the actual machining. The delivery pressures for the electrolyte may amount to 15 kg./cm.$^2$ and above. Under this pressure, a static pressure will generate within the mask, pressing it against the forming ring 17, in addition to the action of the springs. In this manner, a particularly good sealing effect is produced between the mask and the forming ring.

However, certain leakages cannot be avoided for manufacturing reasons. Thus, for example, briquette forming rings are turned along their circumference and have therefore turning grooves, against which the mask cannot form a perfect seal. Further leaks may be caused by foreign bodies between the mask and the forming ring. Leakages may also occur along the sliding faces between the base body 15 and the electrode holder 5. In addition, electrolyte may flow from the mask, due to operating mistakes.

In order to collect leaking electrolyte and to conduct the same back to the electrolyte tank, the tool is equipped with a splash cowling. This cowling consists of a frame 19, mounted firmly and tightly on the tool base plate 2. The splash cowling may also be arranged only on the sides, or else it may be closed at the top. Alternatively, the splash cowling may embrace the tool base plate on all sides.

Figure 2:
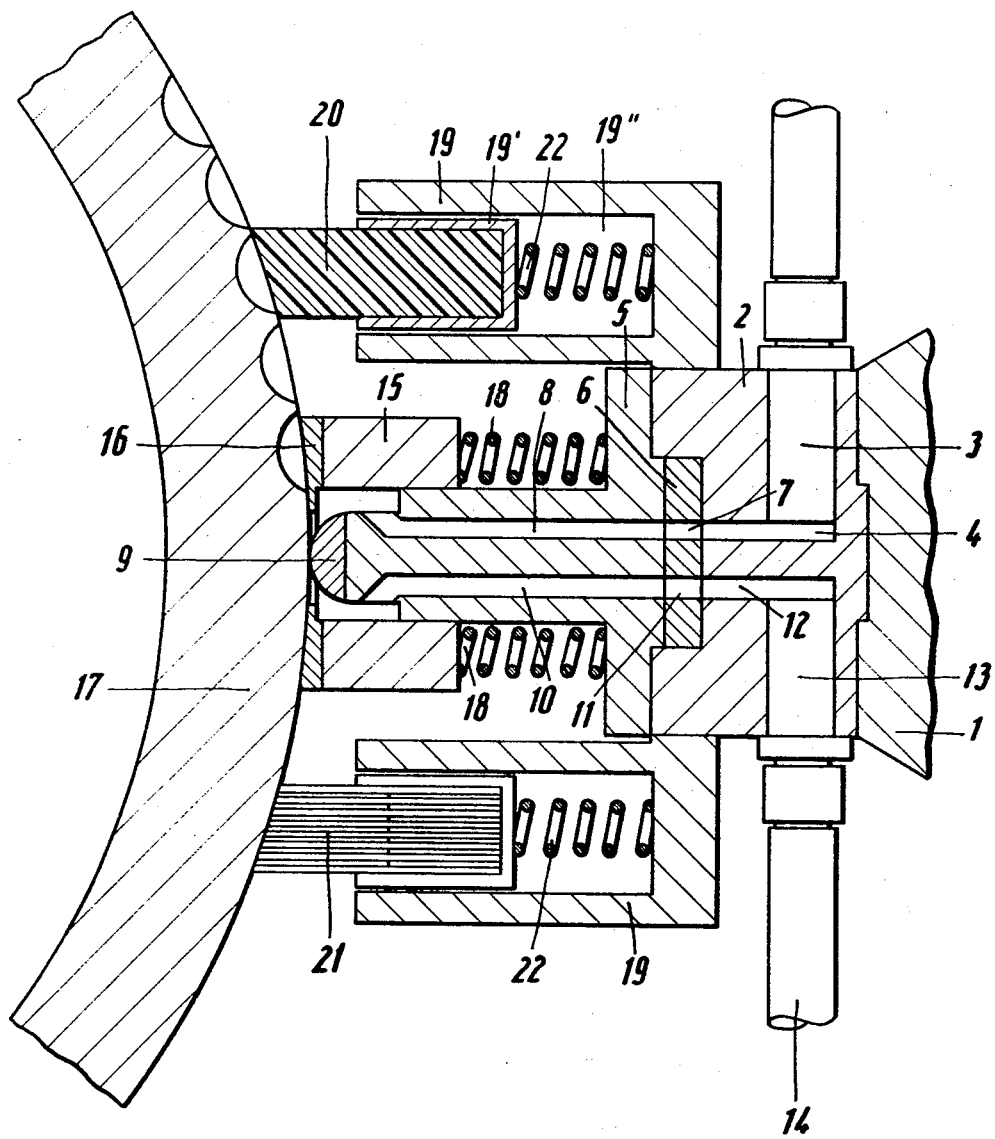
FIG. 2 is a horizontal cross-section of the tool of FIG. 1.

The frame 19 of the splash cowling is provided with grooves 19''; U-shaped seal mountings 19' are displaceably located therein, and are biased by springs 22. Sealing strips 20 and 21, respectively, are fixed in the mountings 19'; these sealing strips may be formed, for example, by a single rubber strip 20, as shown in FIG. 2, top, or by a plurality of rubber strips 21, as shown in FIG, 2, bottom half. When several such rubber strips 21 are used, these are preferably arranged in spaced-apart relationship, forming a labyrinth seal. Preferably, the width of the sealing strips is greater than the width of the forming molds produced, so that the escape of liquid electrolyte through the forming molds formed in the surface is impossible.

Owing to the provision of the splash cowling, electrolyte solution leaking from the workpiece cannot pass outside. The electrolyte collected within the splash cowling may be returned to the tank through a hose.

By way of summary, the invention offers the following advantages:

(1) When different forming rings are machined, which differ in the type of forming mold, the number of simultaneously countersunk forming molds and their mutual spacing, only a few components of the tool need be changed. These parts are the strip 6 which determines the distance between the molds in one row, the electrodes 9 which determine the shape of the molds, and the masks or forming windows 16. This results in substantial savings for the tool, as well as in its universal applicability, and thus also in a better economy of the procees, even with small numbers to be manufactured.

(2) The use of the splash cowling eliminates the necessity of providing a cover hood for the installation. Moreover, the solution of the electrolyte cannot wet the work piece, parts of the installation, chucking mechanisms and the like, and thereby give rise to corrosion. Hence, it is no longer necessary to manufacture certain parts of corrosion resistant materials, and this bring about further economical advantages.

(3) Due to the use of the splash cowling, the major part of the workpiece remains accessible during the machining. As may been seen from FIG. 2, the finished molds can be checked as soon as they leave the splash cowling and any required changes in the working conditions may be made immediately. The machine need not be stopped.

What is claimed is:

1. A multiple tool for electrochemical machining or forming, with a plurality of simultaneously operating individual tools for processing large workpieces, wherein the number of countersinking operations is a multiple of the said number of individual tools, wherein the improvement comprises a splash strip on either side of each individual tool, said splash strip carrying an elastic sealing strip on the side facing the workpiece, and wherein the sealing strip is mounted on a holder which is mounted sealingly on a tool carrier and wherein the holder has a groove open towards the workpiece and the sealing strip is mounted in a carrier guided displaceably in the said groove and biased by springs resting on the bottom of the groove.

2. A multiple tool as set forth in claim 1, wherein the splash strips are provided with upper connecting webs.

3. A multiple tool as set forth in claim 2, wherein the splash strips embrace the totality of the individual tools on all sides.

4. A multiple tool for electrochemical machining or forming, with a plurality of simultaneously operating individual tools for processing large workpieces, wherein the number of countersinking operations is a multiple of the said number of individual tools, wherein the improvement comprises a splash strip on either side of each individual tool, said splash strip carrying an elastic sealing strip on the side facing the workpiece, with a liquid distributor carrying the individual tools and arranged on the feed head, and equipped with connections for supplying and removing liquid electrolyte, wherein the said distributor is provided with longitudinal grooves, open towards the individual tools and communicating with the said connections, and comprising an exchangeable strip, disposed between said distributor and covering said grooves and having connecting bores disposed therein in cooperation with the longitudinal grooves for permitting the flow of said liquid electrolyte therebetween while allowing for the position of each individual tool with respect to the workpieces and the other individual tools to be adjusted.

5. A multiple tool as set forth in claim 4, wherein the splash strips are mounted on the liquid distributor.

6. A multiple tool as set forth in claim 4, wherein each individual tool is provided with a tool mask adapted to be displaced relative to the tool.

7. A multiple tool as set forth in claim 4, wherein a common mask is provided for all tools.

8. A multiple tool as set forth in claim 6, wherein the said tool masks are biased by spring pressure.

9. An electrochemical machining apparatus, for forming a plurality of shaped areas in a workpiece, comprising:

first means, engageably adjoining said workpiece and being displaceable with respect to said workpiece, for simultaneously defining the particular shape of each of a plurality of areas in said workpiece;

second means, coupled to said first means, for providing an electrochemical fluid thereto for forming said plurality of areas in said workpiece; and third means, surrounding said first and second means and being sealingly engaged with said workpiece, for ensuring the confinement of said fluid to a predetermined area of said workpiece and for preventing the contamination of other areas of said workpiece adjacent said apparatus, wherein said first means comprises a plurality of electrodes, each of which is supportedly mounted by an electrode holder on a tool base plate and wherein said second means comprises a longitudinal bore provided within said electrode holder communicating with electrolyte fluid passageways for conveying said electrolyte fluid to and from the area of said workpiece adjacent said electrodes, and wherein said third means comprises an elastic sealing strip mechanically coupled with said first means and urged against the surface of said workpiece facing said first means, and further comprising a frame contacting said tool base plate and being provided with a groove therein for receiving a seal mounting into which said sealing strip is secured, and wherein said groove contains a first resilient member for urging said mounting and said strip toward said workpiece.

10. An apparatus according to claim 9, further comprising an exchangeable strip section disposed between each of said electrode holders and said fluid passageways and having bores disposed therein in cooperation with said longitudinal bores in said electrode holders and said fluid passageways for permitting the flow of said fluid electrolyte therebetween while allowing for the position of each of said electrode with respect to the workpiece and the other electrodes to be adjusted.

11. An apparatus according to claim 10, further comprising an electrode mask, surrounding said electrode facing said workpiece and being mechanically coupled to said electrode holder, said mask comprising a base body and a forming window coupled thereto for defining the surface area formed by the action of said electrode and said electrolyte with said workpiece.

12. An apparatus according to claim 11, further comprising a second resilient member coupled between said electrode holder and said mask for urging said mask against said workpiece.

13. An apparatus according to claim 12, wherein said resilient members comprise springs.

14. An apparatus according to claim 9, wherein said sealing strip comprises a plurality of laminated rubber plates arranged substantially perpendicular to the surface of the workpiece.

15. An apparatus according to claim 14, wherein the width of the sealing strip is greater than the dimensions of an area formed in said workpiece.

16. An electrochemical machining apparatus for forming a plurality of shaped areas in a workpiece comprising:

first means, engageably adjoining said workpiece and being displaceable with respect to said workpiece, for simultaneously defining the particular shape of each of a plurality of areas in said workpiece; and second means coupled to said first means, for providing an electrochemical fluid thereto for forming said plurality of areas in said workpiece, wherein said first means comprises a plurality of electrodes, each of which is supportedly mounted by an electrode holder on a tool base plate and wherein said second means comprises a longitudinal bore provided within said electrode holder communicating with electrolyte fluid passageways for conveying said electrolyte fluid to and from the area of said workpiece adjacent to the electrodes and further including an exchangeable strip section disposed between each of said electrode holders and said fluid passageways and having bores disposed therein in cooperation with said longitudinal bores in said electrode holders and said fluid passageways for permitting the flow of said fluid electrolyte therebetween while allowing for the position of each of said electrodes with respect to the workpiece and with respect to the other electrodes to be adjusted.

17. An apparatus according to claim 16, further comprising third means surrounding said first and second means, and being sealingly engaged with said workpiece for ensuring the confinement of said fluid to a predetermined area of said workpiece and for preventing the contamination of other surface areas of the workpiece adjacent said apparatus, said third means comprising a frame contacting said tool base plate and being provided with a groove therein for receiving a seal mounting into which a sealing strip is secured and wherein said groove contains a first resilient member for urging said mounting and strip toward said workpiece.

18. An apparatus according to claim 17, further comprising an electrode mask, surrounding said electrode facing said workpiece and being mechanically coupled to said electrode holder, said mask comprising a base body and a forming window coupled thereto for defining the surface area formed by the action of said electrode and electrolyte with said workpiece.

19. An apparatus according to claim 18, further comprising a second resilient member coupled between said holder and said mask for urging said mask against said workpiece.

References Cited
UNITED STATES PATENTS

| | | | |
|---|---|---|---|
| 3,515,659 | 6/1970 | Broat et al. | 204—224 |
| 3,001,925 | 9/1961 | Berry | 204—224 |
| 3,223,610 | 12/1965 | Inoue | 204—224 |
| 3,305,470 | 2/1967 | Williams et al. | 204—225 X |
| 3,594,298 | 7/1971 | Abt | 204—225 X |

FOREIGN PATENTS

| | | | |
|---|---|---|---|
| 1,029,233 | 5/1966 | Great Britain | 204—224 |

JOHN H. MACK, Primary Examiner

D. R. VALENTINE, Assistant Examiner

U.S. Cl. X.R.

204—225, 284, 286